United States Patent
Webman et al.

(10) Patent No.: US 9,692,511 B1
(45) Date of Patent: Jun. 27, 2017

(54) REDUNDANT AND RECONFIGURABLE OPTICAL TRANSCEIVER

(71) Applicant: MELLANOX TECHNOLOGIES, LTD, Yokneam (IL)

(72) Inventors: Alon Webman, Tel Aviv (IL); Evelyn Landman, Haifa (IL); Eyal Waldman, Tel Aviv (IL); Elad Mentovich, Tel Aviv (IL); Sylvie Rockman, Zichron Yaakov (IL); Itshak Kalifa, Ramat Gan (IL); Yaakov Gridish, Yoqneam Ilit (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 15/082,313

(22) Filed: Mar. 28, 2016

(51) Int. Cl.
 *H04B 10/40* (2013.01)
 *H04B 10/25* (2013.01)

(52) U.S. Cl.
 CPC ......... *H04B 10/2504* (2013.01); *H04B 10/40* (2013.01)

(58) Field of Classification Search
 CPC .......... H04B 10/1143; H04B 10/25758; H04B 10/25752; H04B 10/25753; H04B 10/2504; H04B 10/40; H04J 14/0298
 See application file for complete search history.

(56) References Cited

U.S. PATENT DOCUMENTS

| | | | |
|---|---|---|---|
| 6,915,075 B1* | 7/2005 | Oberg | H04J 14/0279 398/45 |
| 7,801,442 B2 | 9/2010 | Wang et al. | |
| 8,041,210 B2 | 10/2011 | Aronson et al. | |
| 8,472,805 B2* | 6/2013 | Lam | H04J 14/02 398/196 |
| 9,016,957 B2 | 4/2015 | Ben David et al. | |
| 9,036,990 B2 | 5/2015 | Cole et al. | |
| 2006/0104646 A1 | 5/2006 | Schrodinger | |
| 2015/0050015 A1* | 2/2015 | Levy | H04Q 11/0005 398/2 |

\* cited by examiner

*Primary Examiner* — Ted Wang
(74) *Attorney, Agent, or Firm* — Alston & Bird LLP

(57) ABSTRACT

A reconfigurable and redundant electro-optical connector and corresponding method are provided. The connector may include a first plurality of transducers in communication with a first port and a second plurality of transducers in communication with a second port, the first port and the first transducers defining a first channel and the second port and the second transducers defining a second channel. The connector may include a selective combiner to combine the first optical signals and the second optical signals, and a controller in communication with each of the transducers. The controller may transmit at least a first portion of a first datalink on at least the first channel in a first configuration. The controller may redistribute the first portion of the first datalink onto at least the second channel in a second configuration.

20 Claims, 13 Drawing Sheets

REDUNDANT AND RECONFIGURABLE OPTICAL TRANSCEIVER

BACKGROUND

The present disclosure relates in general to electro-optical interfaces for transmitting optical signals through fiber optic cable systems. In particular, apparatuses and associated methods of assembling electro-optical interfaces and transmitting datalinks via fiber optic cables are described herein.

Active Optical Cables (AOC) include cables that transmit signals over optical media. The AOCs may include separate circuitry that facilitates the transmissions along the optical cables with transceivers including one or more transducers. For example, modern AOCs may use vertical-cavity surface-emitting lasers (VCSELs) to emit light through the fiber optic cables as their electro-optic transducers.

The primary failure mode of AOCs is random failures in the transducers. Traditionally, these transducers were a single point of failure for the AOC, requiring the entire transceiver to be replaced, which requires substantial time, loses substantial bandwidth, and requires large inventories of components in large datacenters.

Applicant has identified a number of additional deficiencies and problems associated with conventional AOC connectors and other associated systems. Through applied effort, ingenuity, and innovation, many of these identified problems have been solved by developing solutions that are included in embodiments of the present invention, many examples of which are described in detail herein.

BRIEF SUMMARY

Provided herein are electro-optical connectors and associated transmission methods, apparatus, and systems. An electro-optical connector may include a first port and a second port configured to receive electrical inputs. The electro-optical connector may include a first plurality of electro-optical transducers in electrical communication with the first port. The first plurality of electro-optical transducers may be configured to convert between first electrical signals received via the first port and respective first optical signals. The first port and the first plurality of electro-optical transducers may define a first channel. The electro-optical connector may include a second plurality of electro-optical transducers in electrical communication with the second port. The second plurality of electro-optical transducers may be configured to convert between second electrical signals received via the second port and respective second optical signals. The second port and the second plurality of electro-optical transducers may define a second channel. The electro-optical connector may include a selective combiner configured to combine the first optical signals and the second optical signals for transmission via one or more optical fibers to a first receiving device. Embodiments of the electro-optical connector may include a controller in communication with each of the first plurality of electro-optical transducers and the second plurality of electro-optical transducers. The controller may be configured to transmit at least a first portion of a first datalink on at least the first channel in a first configuration. The first datalink may define an electrical communication between a first transmitting device and the first receiving device via the one or more fibers. The controller may be configured to redistribute the first portion of the first datalink onto at least the second channel in a second configuration, and the first configuration may comprise a different selection of channels than the second configuration.

In some embodiments, in the first configuration, the controller may be configured to transmit at least a second portion of the first datalink on the second channel. In the first configuration, the first datalink may consists of the first portion of the first datalink and the second portion of the first datalink.

In the second configuration, the controller may be configured to transmit the first datalink on the second channel. In some embodiments, the controller may be configured to redistribute the first portion of the first datalink onto at least the second channel in response to failure of one or more of the first plurality of electro-optical transducers.

In some embodiments, the electro-optical connector may further include a third port and a fourth port configured to receive additional electrical inputs. The electro-optical connector may include a third plurality of electro-optical transducers in electrical communication with the third port. The third plurality of electro-optical transducers may be configured to convert between third electrical signals received via the third port and respective third optical signals. The third port and the third plurality of electro-optical transducers may define a third channel. Embodiments of the electro-optical connector may include a fourth plurality of electro-optical transducers in electrical communication with the fourth port. The fourth plurality of electro-optical transducers may be configured to convert between fourth electrical signals received via the fourth port and respective fourth optical signals. The fourth port and the fourth plurality of electro-optical transducers may define a fourth channel. The selective combiner may be configured to combine the third optical signals and the fourth optical signals for transmission via one or more second fibers to a second receiving device. The controller may be in communication with each of the third plurality of electro-optical transducers and the fourth plurality of electro-optical transducers. In some embodiments, the controller may be configured to transmit at least a first portion of a second datalink on at least the third channel in the third configuration. The controller may be configured to redistribute the first portion of the second datalink onto at least the fourth channel in the fourth configuration, and the third configuration may comprise a second different selection of channels than the fourth configuration.

In some embodiments, the second datalink may be different than the first datalink, and the second receiving device may be different than the first receiving device.

In some embodiments, the electro-optical connector may include a fifth port and a sixth port configured to receive further electrical inputs. The electro-optical connector may include a fifth plurality of electro-optical transducers in electrical communication with the fifth port. The fifth plurality of electro-optical transducers may be configured to convert between fifth electrical signals received via the fifth port and respective fifth optical signals. The fifth port and the fifth plurality of electro-optical transducers may define a fifth channel. The electro-optical connector may further include a sixth plurality of electro-optical transducers in electrical communication with the sixth port. The sixth plurality of electro-optical transducers may be configured to convert between sixth electrical signals received via the sixth port and respective sixth optical signals. The sixth port and the sixth plurality of electro-optical transducers may define a sixth channel. The selective combiner may be configured to combine the fifth optical signals and the sixth optical signals for transmission via the one or more fibers to the first receiving device. The controller may be in communication with each of the fifth plurality of electro-optical transducers and the sixth plurality of electro-optical transducers. The controller may be configured to transmit additional respective portions of the first datalink to the first receiving device on the fifth channel and the sixth channel.

In some embodiments, in the first configuration, the controller may be configured to transmit at least a second portion of the first datalink on the second channel. In the first configuration, the first datalink may consist of the first portion, the second portion, a fifth portion defining the respective portion of the first datalink on the fifth channel, and the sixth portion defining the respective portion of the first datalink on the sixth channel.

In another embodiment, a method for transmitting one or more datalinks via an electro-optical connector may be provided. The electro-optical connector may include a first port and a second port configured to receive electrical inputs. The electro-optical connector may further comprise a first plurality of electro-optical transducers in electrical communication with the first port. The first plurality of electro-optical transducers may be configured to convert between first electrical signals received via the first port and respective first optical signals. The first port and the first plurality of electro-optical transducers may define a first channel. The electro-optical connector may include a second plurality of electro-optical transducers in electrical communication with the second port. The second plurality of electro-optical transducers may be configured to convert between second electrical signals received via the second port and respective second optical signals. The second port and the second plurality of electro-optical transducers may define a second channel. The electro-optical connector may further include a selective combiner configured to combine the first optical signals and the second optical signals for transmission via one or more optical fibers to a first receiving device, and a controller in communication with each of the first plurality of electro-optical transducers and the second plurality of electro-optical transducers.

The method may include transmitting, in a first configuration, with the controller, at least a first portion of a first datalink on at least the first channel. The first datalink may define an electrical communication between a first transmitting device and the first receiving device via the one or more fibers. The method may further include redistributing the first portion of the first datalink onto at least the second channel in a second configuration. The first configuration may comprise a different selection of channels than the second configuration.

Some embodiments of the method may include, in the first configuration, transmitting at least a second portion of the first datalink on the second channel. In the first configuration, the first datalink may consist of the first portion of the first datalink and the second portion of the first datalink.

Embodiments of the method, in the second configuration, may include transmitting the first datalink on the second channel. Redistributing the first portion of the first datalink onto at least the second channel in the second configuration may further comprise detecting a failure of one or more of the first plurality of electro-optical transducers.

In some embodiments, the electro-optical connector further comprises a third port and a fourth port configured to receive additional electrical inputs. The electro-optical connector may further include a third plurality of electro-optical transducers in electrical communication with the third port. The third plurality of electro-optical transducers may be configured to convert between third electrical signals received via the third port and respective third optical signals. The third port and the third plurality of electro-optical transducers may define a third channel. The electro-optical connector may include a fourth plurality of electro-optical transducers in electrical communication with the fourth port. The fourth plurality of electro-optical transducers may be configured to convert between fourth electrical signals received via the fourth port and respective fourth optical signals. The fourth port and the fourth plurality of electro-optical transducers may define a fourth channel. The selective combiner may be configured to combine the third optical signals and the fourth optical signals for transmission via one or more second fibers to a second receiving device; and the controller may be in communication with each of the third plurality of electro-optical transducers and the fourth plurality of electro-optical transducers. The method may further include transmitting at least a first portion of a second datalink on at least the third channel in the third configuration, and the method may include redistributing the first portion of the second datalink onto at least the fourth channel in the fourth configuration. The third configuration may comprise a second different selection of channels than the fourth configuration.

In some embodiments, the second datalink may be different than the first datalink, and the second receiving device may be different than the first receiving device.

In some embodiments of the method, the electro-optical connector may further comprise a fifth port and a sixth port configured to receive further electrical inputs. The electro-optical connector may include a fifth plurality of electro-optical transducers in electrical communication with the fifth port. The fifth plurality of electro-optical transducers may be configured to convert between fifth electrical signals received via the fifth port and respective fifth optical signals. The fifth port and the fifth plurality of electro-optical transducers may define a fifth channel. The electro-optical connector may further include a sixth plurality of electro-optical transducers in electrical communication with the sixth port. The sixth plurality of electro-optical transducers may be configured to convert between sixth electrical signals received via the sixth port and respective sixth optical signals. The sixth port and the sixth plurality of electro-optical transducers may define a sixth channel. The selective combiner may be configured to combine the fifth optical signals and the sixth optical signals for transmission via the one or more fibers to the first receiving device; and the controller may be in communication with each of the fifth plurality of electro-optical transducers and the sixth plurality of electro-optical transducers. Embodiments of the method may further comprise transmitting additional respective portions of the first datalink to the first receiving device on the fifth channel and the sixth channel.

In some embodiments, the first configuration may comprise transmitting at least a second portion of the first datalink on the second channel.

In some embodiments, in the first configuration, the first datalink may consists of the first portion, the second portion, a fifth portion defining the respective portion of the first datalink on the fifth channel, and the sixth portion defining the respective portion of the first datalink on the sixth channel.

BRIEF DESCRIPTION OF THE SEVERAL VIEWS OF THE DRAWINGS

Figure 1A:
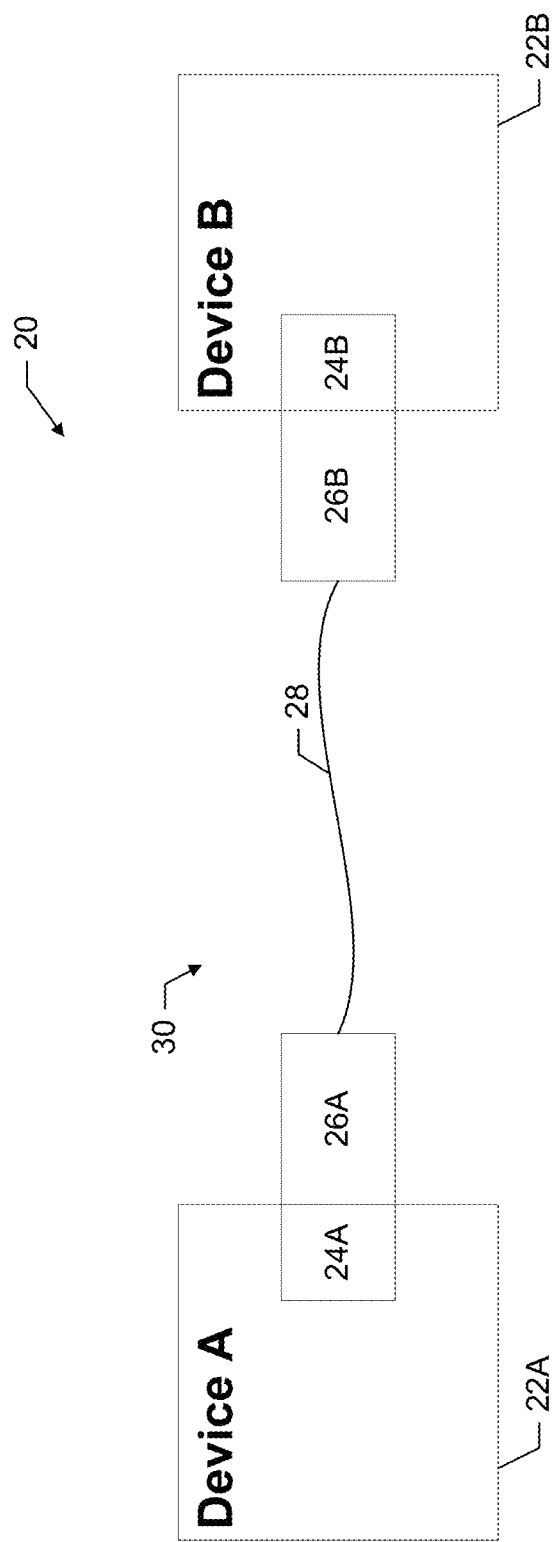
Figure 1B:
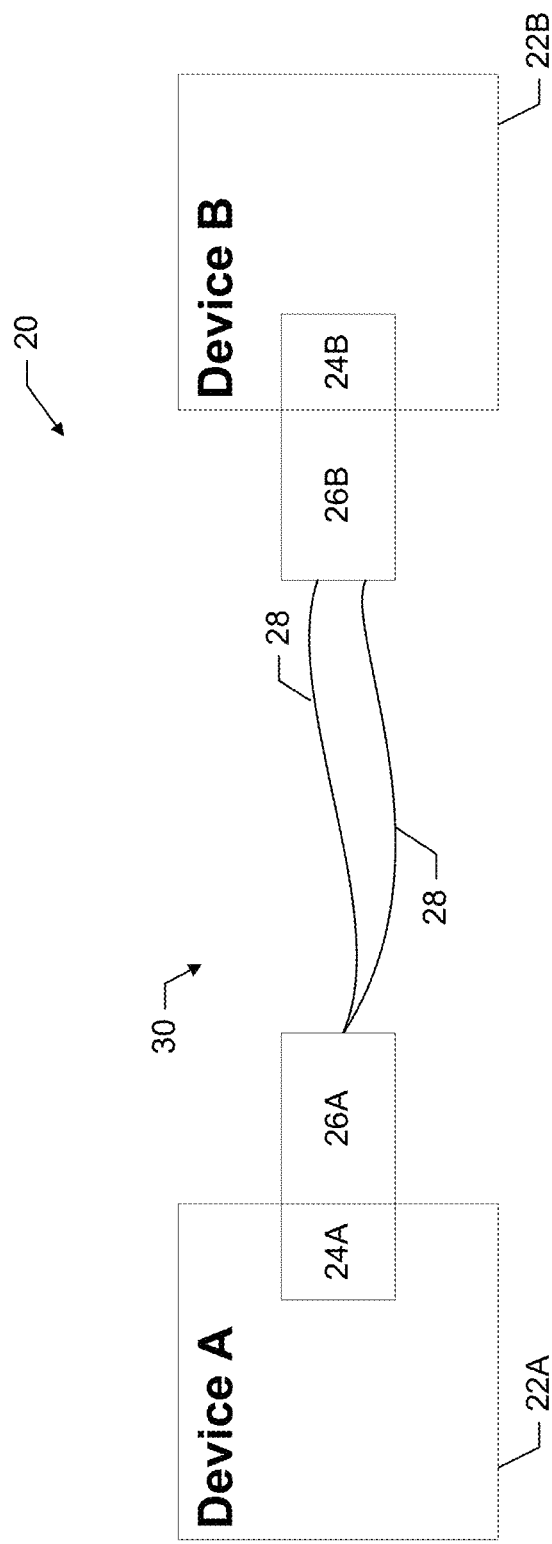
Figure 2:
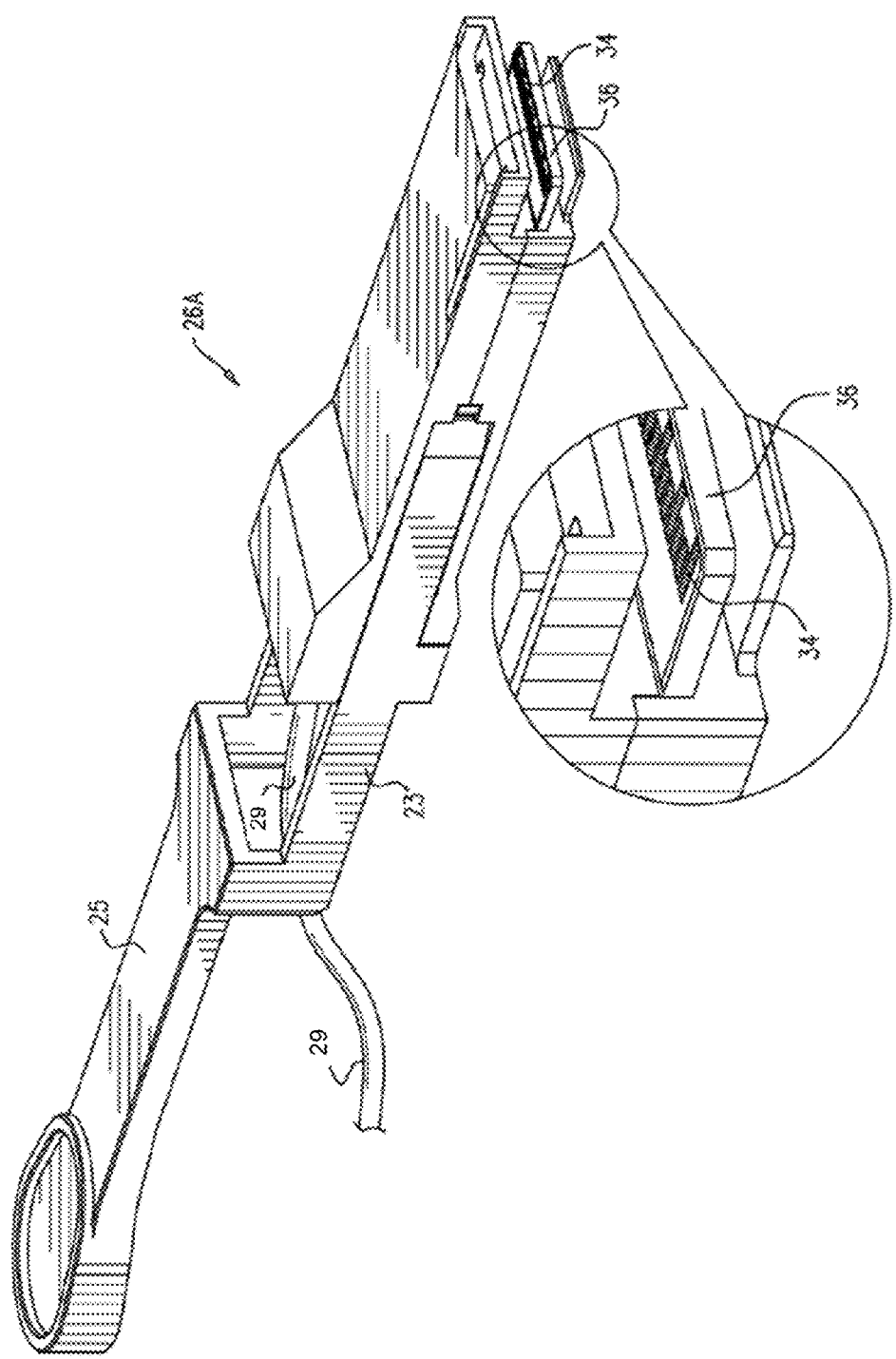
Figure 3:
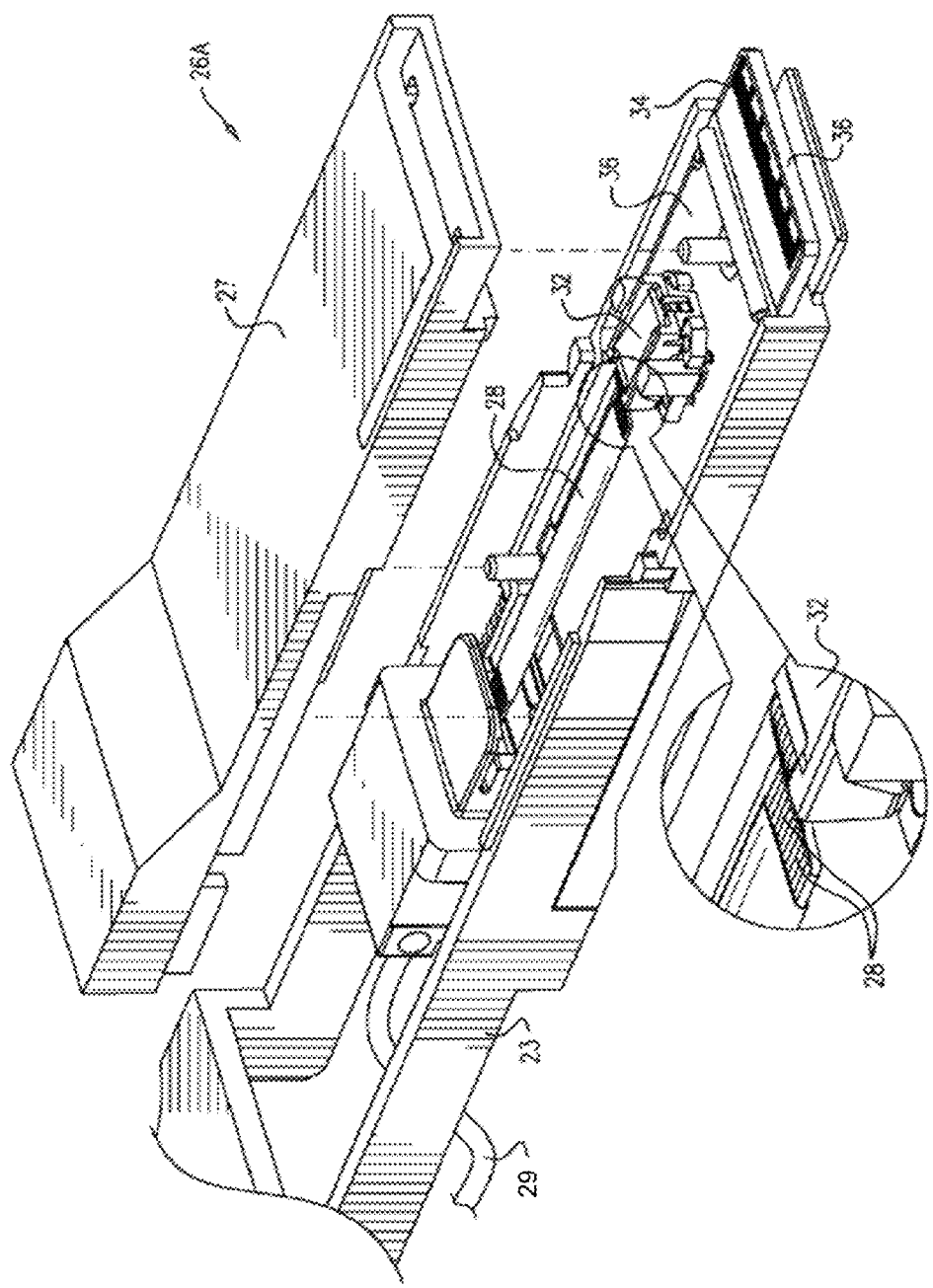
Figure 4:
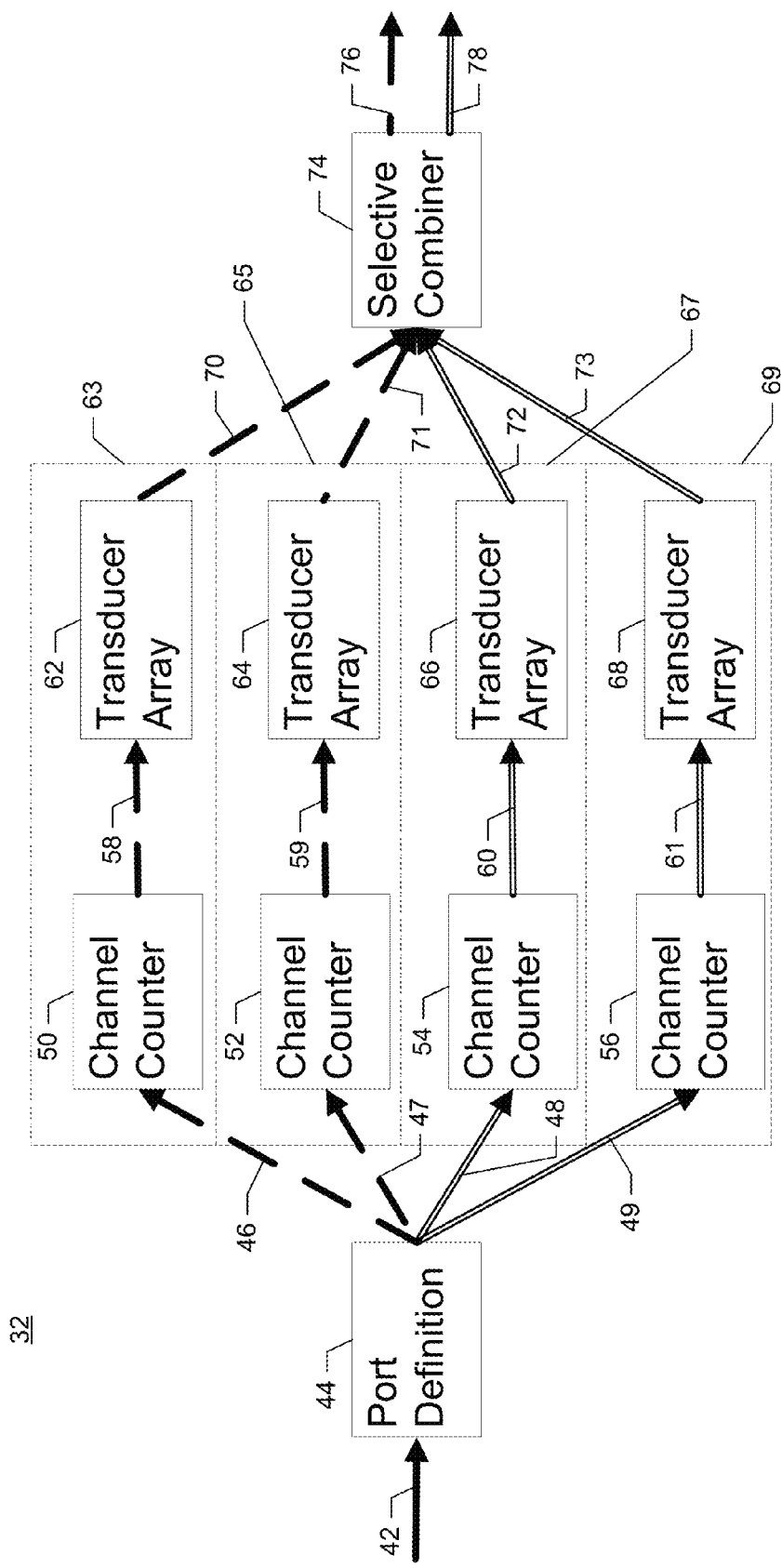
Figure 5:
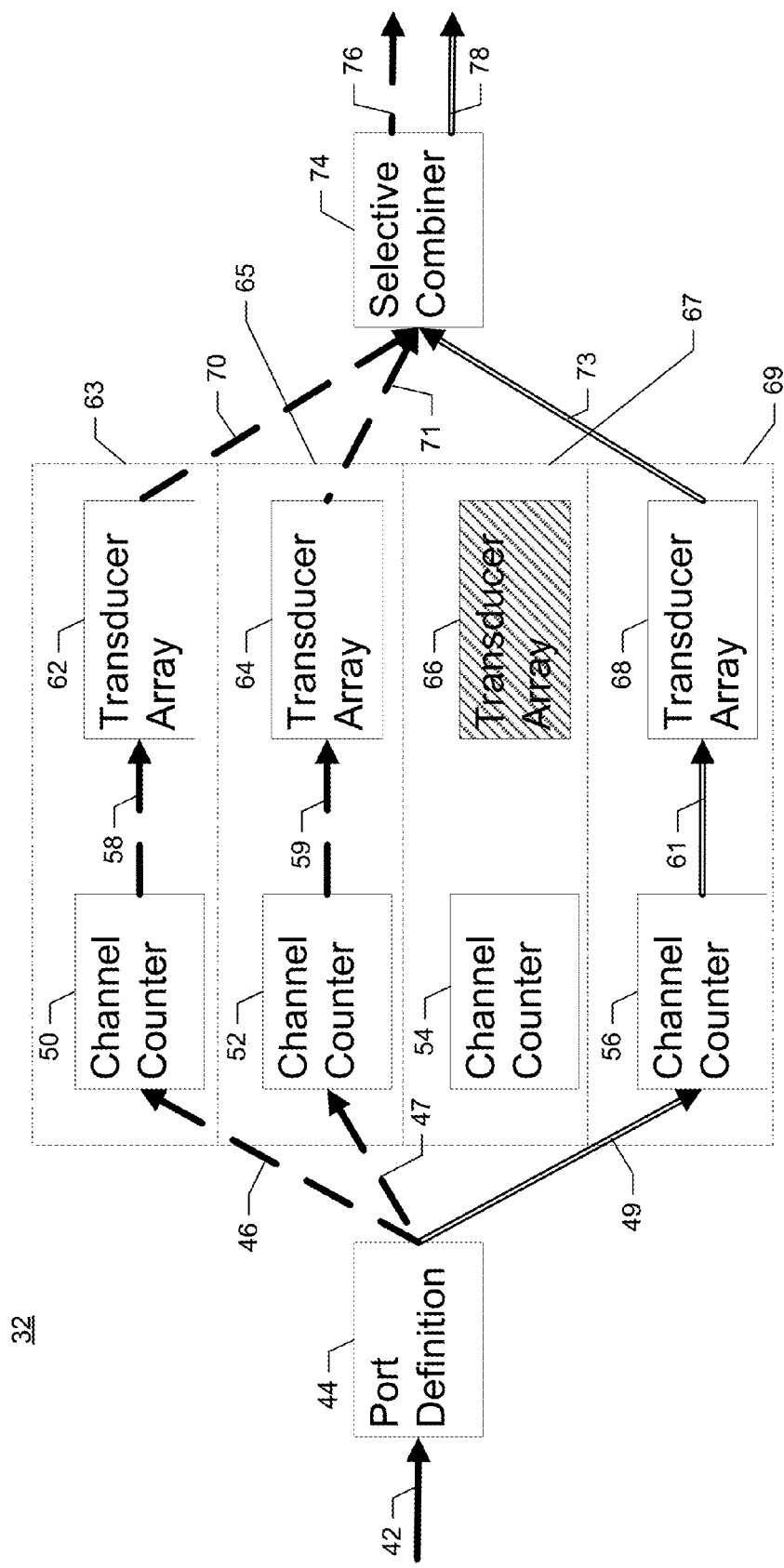
Figure 6:
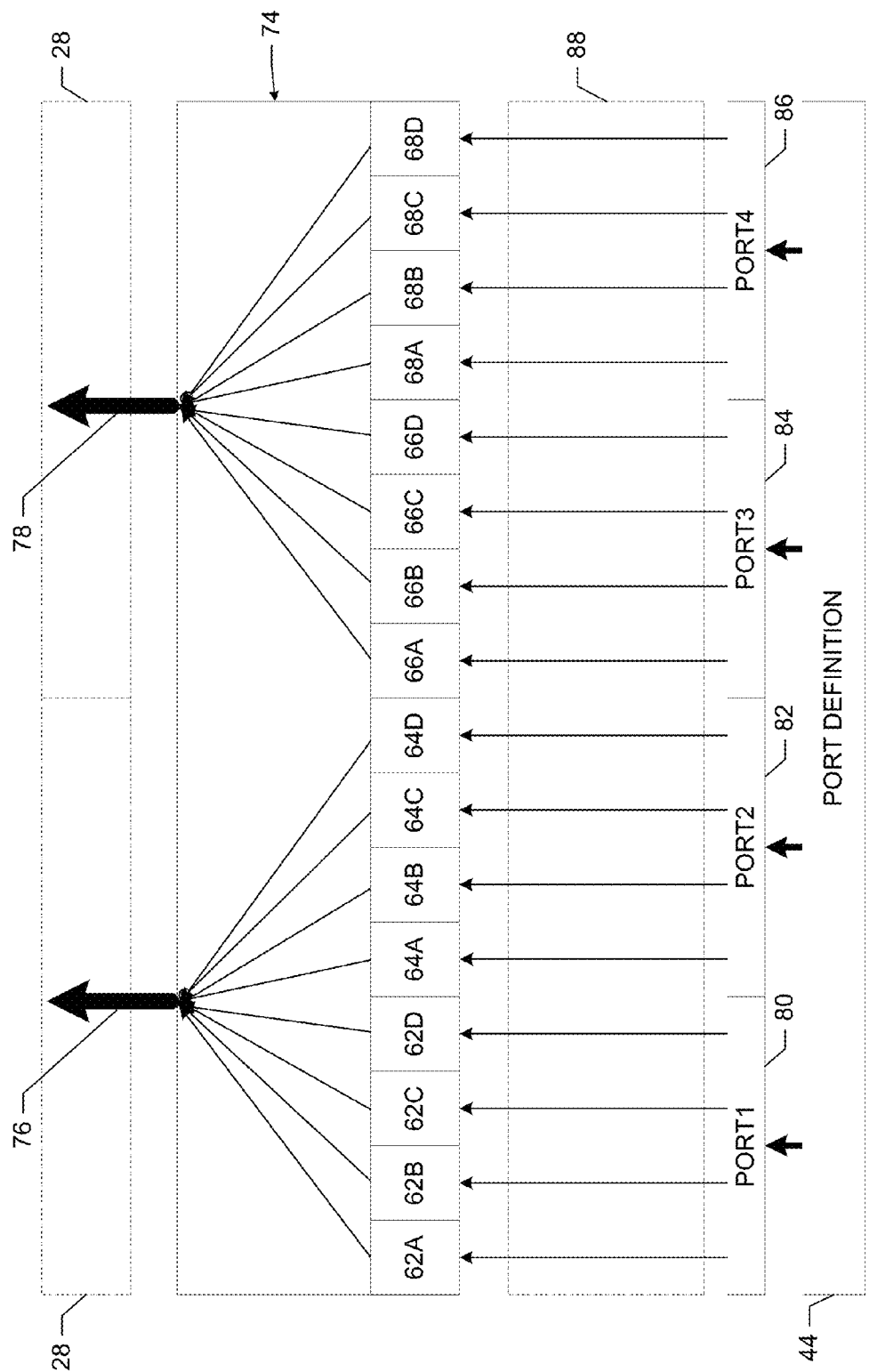
Figure 7:
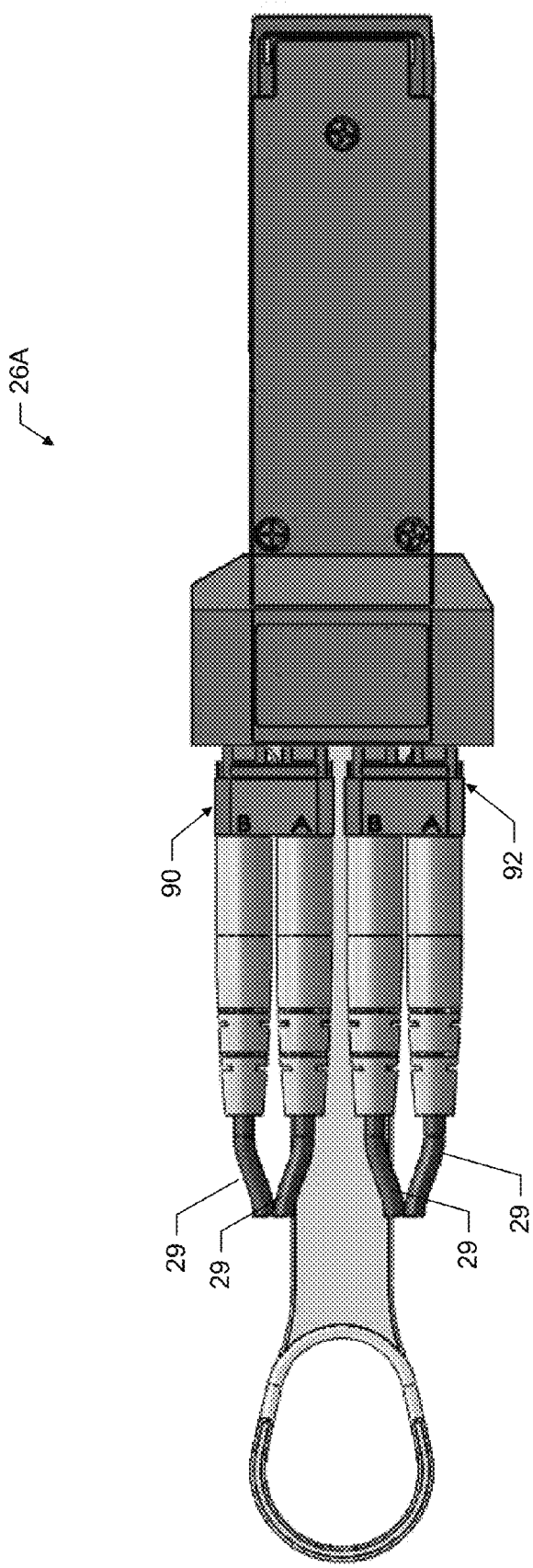
Figure 8:
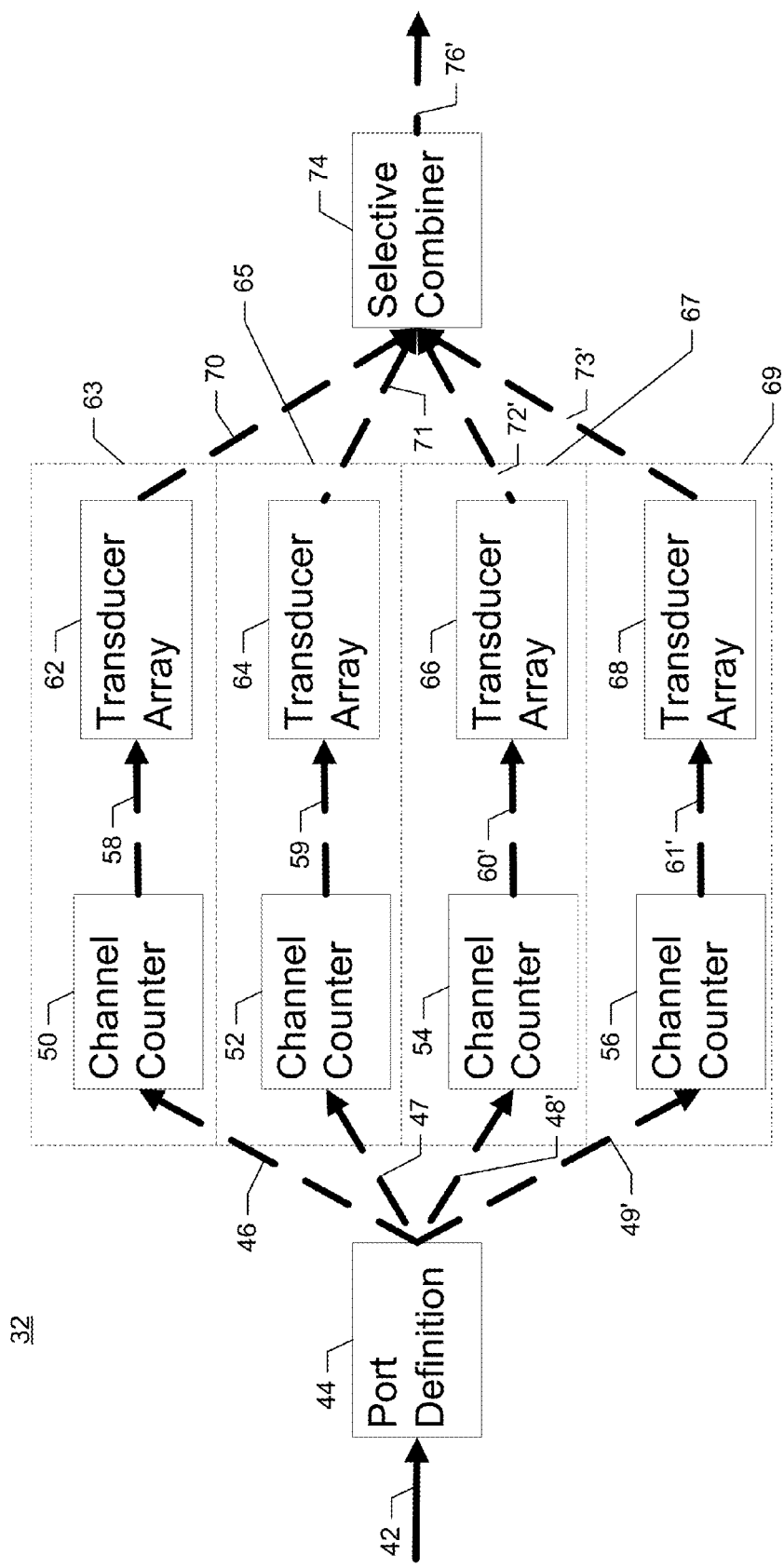
Figure 9:
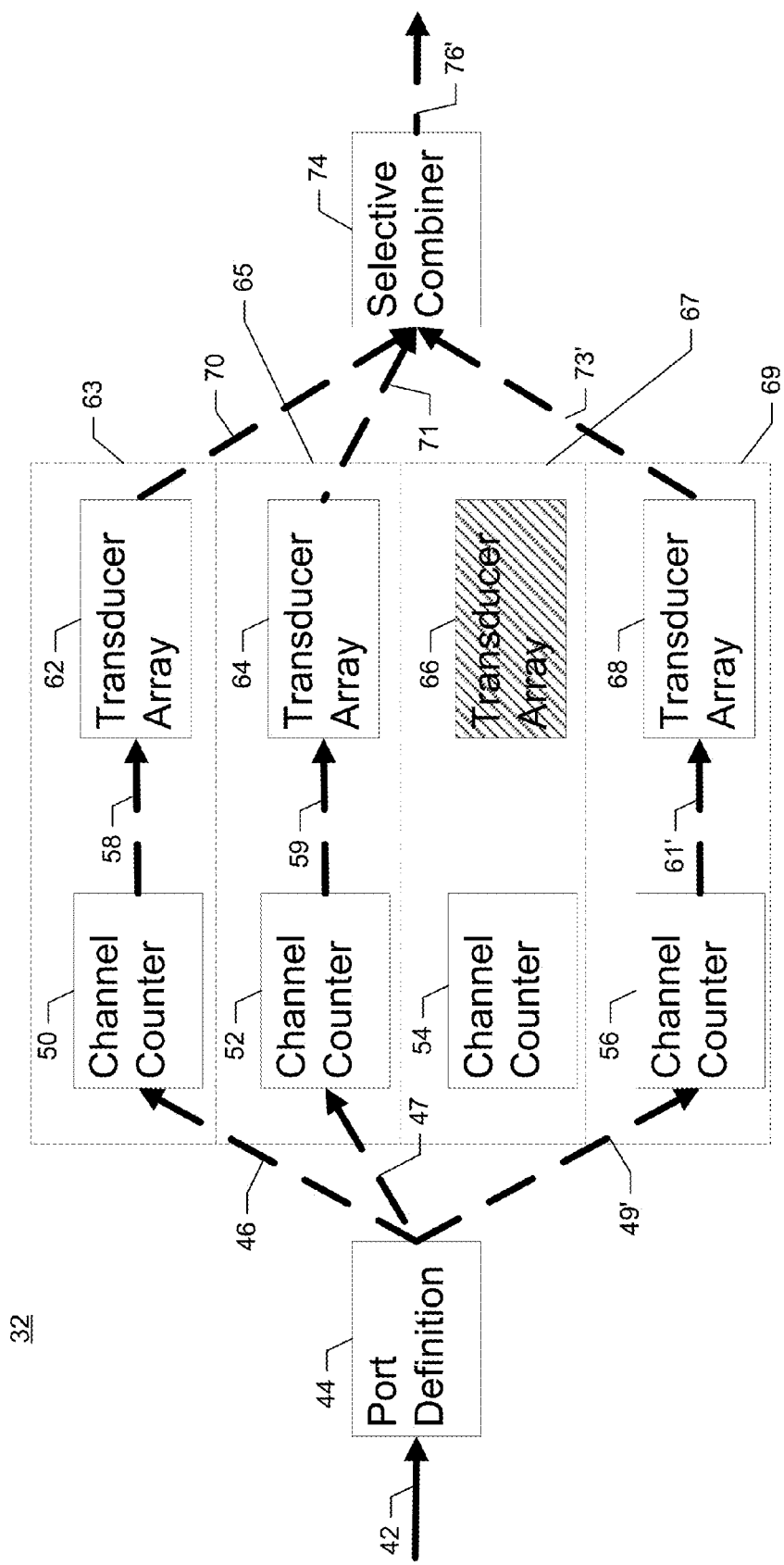
Figure 10:
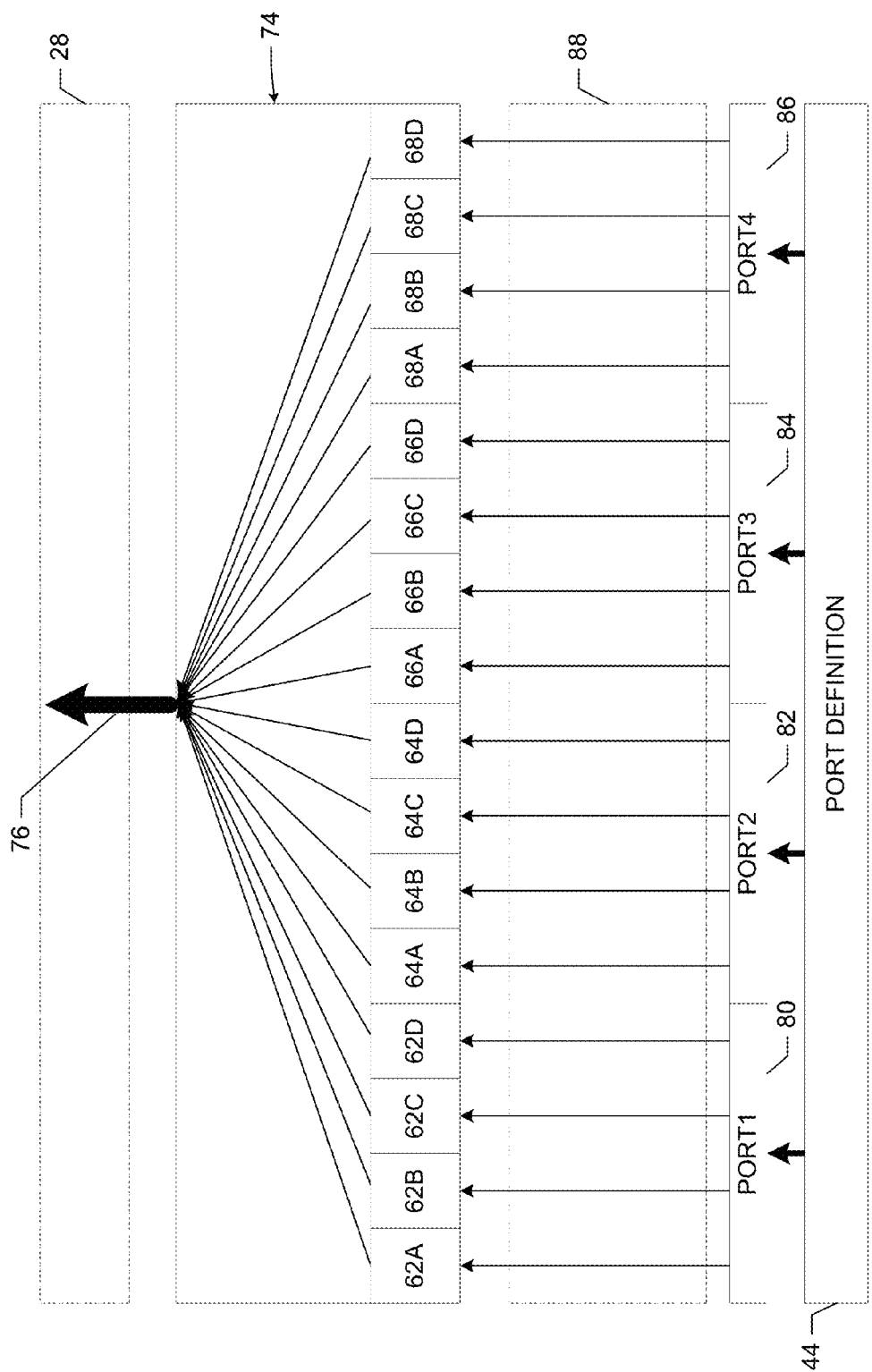
Figure 11:
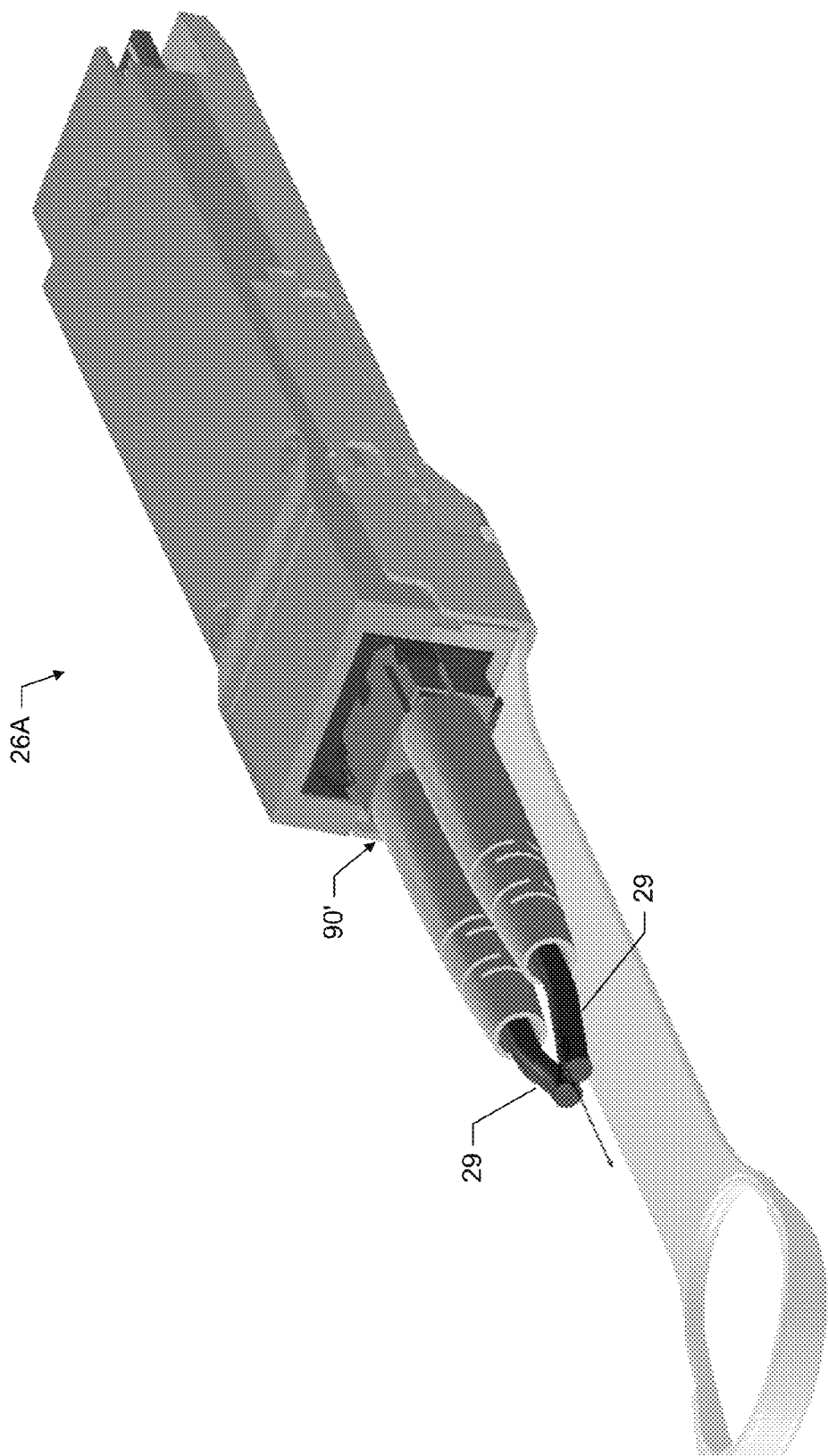
Figure 12:
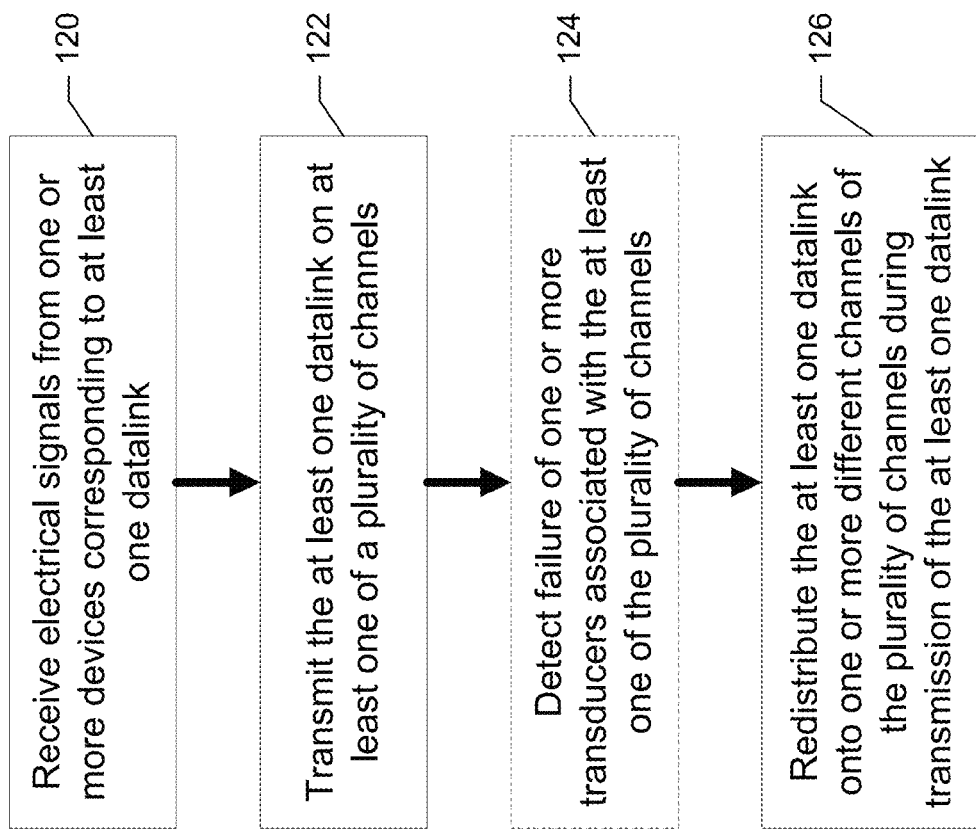

Having thus described the disclosure in general terms, reference will now be made to the accompanying drawings, which are not necessarily drawn to scale, and wherein:

FIGS. 1A-1B show block diagrams illustrating optical communication systems, in accordance with some embodiments discussed herein;

FIG. 2 shows a transceiver module in accordance with some embodiments discussed herein;

FIG. 3 shows an interior view of the transceiver module shown in FIG. 2;

FIG. 4 shows a block diagram schematically illustrating an optical interface module in accordance with some embodiments discussed herein;

FIG. 5 shows the block diagram of FIG. 4 having a transducer failure;

FIG. 6 shows a block diagram schematically illustrating the transceiver of FIG. 4;

FIG. 7 shows a transceiver module in accordance with some embodiments of FIG. 4;

FIG. 8 shows a block diagram schematically illustrating an optical interface module in accordance with some embodiments discussed herein;

FIG. 9 shows the block diagram of FIG. 8 having a transducer failure;

FIG. 10 shows a block diagram schematically illustrating the transceiver of FIG. 8;

FIG. 11 shows a transceiver module in accordance with some embodiments of FIG. 8; and FIG. 12 shows a flow chart that schematically illustrates a method for transmitting one or more datalinks using an AOC having redundant and reconfigurable connectors in accordance with some embodiments discussed herein.

DETAILED DESCRIPTION

Overview

AOCs comprise one or more optical fibers. Such cables comprise optical transmitters and receivers built into connector modules at the ends of the cable for transmitting and receiving the optical communication signals carried by the fibers. The connector modules may include small form-factor pluggable (SFP) transceivers or dual SFP transceivers. The connector modules plug into suitable electrical communication ports, such as Gigabit Ethernet or InfiniBand® ports, of switching and computing equipment. Electro-optical components in the connector modules convert the high-speed electrical signals output by the ports into optical signals for transmission over the fibers. In addition, the electro-optical components convert the optical signals received over the fibers into high-speed electrical signals for input to the ports. Such connector modules are commonly referred to as transceiver modules.

In many AOCs, laser diodes, such as VCSELs, are used in the transceiver modules to generate the optical signals for transmission over the fibers. VCSELs in particular are favored for their high bandwidth and efficiency. In some implementations, an array of such VCSELs is used to drive a corresponding array of optical fibers, which are joined together in a ribbon configuration. At a receiving end of the optical fibers, one or more photodiodes may receive the light from the VCSELs and convert the incident light into electrical signals. One or more ports may be provided for receiving the electrical signals for transmission from a transmitting device or receiving the electrical signals after reception from the transmitting device, and each port may be associated with one or more VCSELs and/or photodiodes. The ports may transmit the electrical signals to the transducer arrays, in a transmitting configuration, and/or to the receiving device, in a receiving configuration. Each port and the corresponding transducers may define a channel through which a datalink may be established.

Embodiments of the present invention that are described hereinbelow provide AOCs and transceiver modules with redundant and reconfigurable optical channels. The redundancy and reconfigurability is implemented by a programmable electro-optical interface that redistributes one or more datalinks between one or more channels of the transceiver module. The channels of the transceiver module may be used in parallel to transmit a datalink in higher bandwidth, or the channels may be deactivated when the transceiver transmits or receives fewer datalinks than the total number of channels available. In some further embodiments, one or more actively transmitting channels may be used to redistribute a datalink in the event of a transceiver failure. As detailed below, connectors according to some embodiments may use two or more channels to transmit a datalink to a receiving device. In some embodiments one connector may transmit data to multiple receiving devices, over two or more channels.

In some embodiments, the optical interface module (OIM) comprises an array of electro-optical transducers, which are configured to convert between electrical signals and respective optical signals conveyed over respective optical fibers. In addition, the OIM comprises a controller (e.g., a microcontroller), which is configured to switch one or more of the electrical and optical signals between the transducers. As used herein, the controller may be implemented as hardware and/or software in the OIM to carry out the programmed functions. For example, in the depicted embodiments, the controller may include a microcontroller electrically connected with the OIM. The transducers are capable of converting from electrical signals to optical signals, and/or from optical signals to electrical signals. A connector housing holds the array of transducers and the control circuitry, including the controller.

In response to a failure of a transducer in an array that is associated with a given port, the circuitry switches to replace the port and channel of the failed transducer with a redundant channel having a functional transducer in the array in order to convey the optical signal over a second optical fiber without reconfiguration of the cable or the ports.

Identification of the failure may be carried out in various ways. In one embodiment, an optical detector at the opposite end of the active optical cable may sense the failed transducer by not detecting an optical signal in the respective fiber. Subsequently, this failure may be transmitted to the control circuitry, which activates switches to reroute the respective signal and bypass the failed transducer.

In another embodiment, the controller at the transmit end may sense a failure by recognizing changes in the characteristics of a transducer. In response, the controller may redistribute at least a portion of one or more of the datalinks to bypass the channel of the failed transducer.

Embodiments of the programmable AOC transceiver discussed herein may be reconfigurable to transmit one or more datalinks over one or more channels and redistribute the one or more datalinks to other combinations of channels, including transmitting a datalink over multiple channels in parallel or deactivating and/or activating one or more channels to carry a datalink. Some embodiments of the AOC transceiver may further include fiber cables extending to two or more receiving devices, with two or more redundant and reconfigurable channels transmitting separate datalinks to each of the receiving devices.

For the sake of clarity and convenience of description, the embodiments that are described below refer to a particular optical cable configuration, using VCSELs as emitters and certain types of switching elements. The principles of the present invention, however, may similarly be implemented using other types of emitters and switching elements, as well as differently configured optical cables and connector modules.

System Architecture

FIGS. 1A-1B show block diagrams that schematically illustrates an optical communication system 20, in accordance with some embodiments described herein.

Communication ports 24A and 24B of two devices 22A and 22B, also herein termed "device A" and "device B," are connected by an AOC 30. In some embodiments, the devices 22A, 22B may include one or more network switches. Cable 30 comprises a ribbon of one or more optical fibers 28, terminated at each end by transceiver modules 26A and 26B. In the embodiment shown in FIG. 1B, the Cable 30 comprises two sets of fibers 28 for transmitting separate datalinks, as detailed below. The terms "transceiver module" and "connector module" are used interchangeably in the present patent application.

Each transceiver module comprises signal conversion components, such as arrays of optical emitters and optical receivers, assembled in an optical interface module 32, as will be described with respect to FIGS. 4-6 and 8-10. The emitters and receivers are connected to respective fibers 28. The terms "emitter" and "transmitter" are used interchangeably.

For example, one or more emitters, such as a VCSEL in module 26A, receives electrical inputs from a port 24A to which it is connected and outputs corresponding optical signals to fiber 28. A receiver in module 26B receives optical signals from fiber 28 and converts them to corresponding electrical signals for input to port 24B. In the embodiment shown in FIG. 1B, two receiver modules 26B may be used, such that each set of fibers 28 terminates at a separate receiver. In some embodiments, with continued reference to FIG. 1B, a single receiver 26B may receive optical signals from both sets of fibers, and the device 22B may direct the datalinks from the respective sets of fibers 28 to different receiving devices.

Although reference may be made to transmitters or receivers individually in the description that follows, the same sort of reconfigurable and redundant scheme that is described herein with respect to the transmitters may similarly be implemented on the receiving side and vice versa. In some embodiments, the transducers on the receiving end may be photodetectors (PD) or other receiving transducers.

FIG. 2 is a schematic pictorial illustration of a transceiver module 26A, and FIG. 3 is a schematic pictorial exploded illustration of the transceiver module, in accordance with some embodiments of the present invention.

A housing 23 comprises a handle 25 and a printed circuit board (PCB) 36 connected to a bundle 29 of one or more fibers 28 (shown in FIG. 3). Handle 25 inserts/ejects PCB 36 to/from a socket in port 24A (shown in FIG. 1). PCB 36 conducts electrical communication signals, via copper inputs 34, into module 26A and supports components such as the VCSELs, PDs, controller, etc. for converting the electrical signals to optical communication signals and/or vice versa. Fibers 28 carry the optical communication signals between module 26A and module 26B. As detailed below with respect to FIGS. 7 and 11, multiple fiber bundles may connect to the transceiver module.

With continued reference to FIGS. 2-3, module 26A comprises a housing 23 including a top cover 27, and comprises the electrical and optical components of module 26A. Copper inputs 34 conduct an electrical communication signal via PCB 36 into an optical interface module 32, which converts the electrical communication signal into an optical communication signal. Module 32 comprises multiple transducers, such as vertical-cavity surface emitting lasers (VCSELs), and may include a controller. In some embodiments, the controller may be electrically coupled with the OIM 32 and positioned separately on the PCB 36. The VCSELs receive electrical inputs from PCB 36 and convert them to optical signals. Fibers 28 carry the optical communication signals from module 32 to module 26B.

In some embodiments, the AOC 30 is designed for duplex operation (e.g., transmitting and receiving optical communication signals on the same fiber). On the other hand, the principles of this embodiment are equally applicable to cables used for simplex communications (e.g., unidirectional communication per fiber), with only transmitters at one end, and receivers at the other end of fibers 28.

FIG. 4 shows a block diagram schematically illustrating operation of an optical interface module 32 in accordance with some embodiments discussed herein. Upon receiving signals 42 from device 22A (shown in FIGS. 1A-1B) via the copper inputs 34 (shown in FIG. 3), the optical interface module 32 of the transceiver module 26A directs the signals to the respective channels 63, 65, 67, 69 using a port definition driver 44. The channels include the channel counters 50, 52, 54, 56; the corresponding transducers arrays 62, 64, 66, 68; and the respective fibers (e.g., fibers 28 shown in FIGS. 1A-3) connected to each transducer. In some embodiments, the channels 63, 65, 67, 69 may further include intermediate components and connections such as various optical media and control circuitry.

The port definition driver 44 may be included in the transceiver module drivers (e.g., module 26A shown in FIGS. 2-3) and may be embodied as hardware, software, and/or firmware of the programmable connector, which may be included in the operation of the controller in the optical interface module (e.g., optical interface module 32 shown in FIG. 3) at the PCB (e.g., PCB 36 shown in FIG. 3). The port definition driver 44 receives signals 42 as input from the physical ports (e.g., port 24A shown in FIGS. 1A-1B) of the device(s) (e.g., device 22A shown in FIGS. 1A-1B) connected to the AOC for transmission to a receiving device(s) (e.g., device 22B shown in FIG. 1). The port definition driver 44 may monitor the status of the channels; may assign the signals 42 to any of the respective channels; and may direct the portions of the signal corresponding to each channel 46, 47 to the respective channel counters 50, 52. The port definition driver 44 may separate two or more datalinks for transmission to multiple receiving devices via the AOC.

The channel counters 50, 52, 54, 56 may count the channels 63, 65, 67, 69 of the connector and control activation and deactivation of the respective channels. In some embodiments, the port definition driver 44 may assign all or a portion of a datalink to one or more of the respective channel counters 50, 52, 54, 56. For example, in the embodiment of FIG. 4, the port definition driver 44 assigns a first portion 46 of a first datalink in the received signal 42 to a first channel counter 50 and a second portion 47 of the first datalink in the received signal to a second channel counter 52. Similarly, the port definition driver 44 shown in FIG. 4, assigns a first portion 48 of a second datalink in the received signal 42 to a third channel counter 54 and a second portion 49 of the second datalink in the received signal to a fourth channel counter 56. As detailed below, the respective first datalink 76 and second datalink 78 may be sent over separate fibers (e.g., fibers 28 shown in FIG. 1B) to separate receiving devices. The channel counters 50, 52, 54, 56 may activate the respective transducers 62, 64 associated with the channels 63, 65, 67, 69. The channel counter 50, 52, 54, 56 may be embodied as hardware, software, and/or firmware of the programmable connector, which may be included in the operation of the controller in the optical interface module (e.g., optical interface module 32 shown in FIG. 3) at the PCB (e.g., PCB 36 shown in FIG. 3).

The transducer arrays 62, 64, 66, 68 may define one or more electro-optical interfaces for converting the electrical signals into optical signals on the transmission end (e.g., at electro-optical interface module 26A in FIGS. 1A-1B) and converting optical signals back to electrical signals on the receiving end (e.g., at electro-optical interface module 26B in FIGS. 1A-1B) of the AOC (e.g., AOC 30 shown in FIGS. 1A-1B). The transducer arrays 62, 64, 66, 68 may include one or more VCSELs in some embodiments, as discussed above, that may be optically coupled to one or more fibers (e.g., fibers 28 shown in FIGS. 1A-1B). In some embodiments, one or more selective combiners 74 may receive the optical output signals (e.g., optical signals 70, 71 and optical signals 72, 73 shown in FIG. 4) from the transducer arrays 62, 64, 66, 68, respectively, and direct combined optical datalink signals 76, 78 to the respective fibers (e.g., fibers 28 shown in FIGS. 1A-1B). For example, in the embodiments shown in FIGS. 4-7, two selective combiners 74 may be used, one corresponding to the fibers 28 associated with each of the respective datalink signals 76, 78. Alternatively, the embodiment shown in FIGS. 4-7 may use a single selective combiner 74 for directing the optical signals to the fibers 28 corresponding to each of the respective datalink signals 76, 78.

The selective combiner 74 may include one or more optical switches (e.g., lenses) for selectively combining the output optical signals (e.g., optical signals 70, 71, 72, 73 shown in FIG. 4) and directing the combined optical signals 76, 78 to one or more fibers 28. Various different technologies may be used in implementing the selective combiner, which may include one or more optical switches. The switches may include MEMS devices, such as switched mirrors for deflecting the optical beams between the transmitters and the fibers. Alternatively, the optical switches may comprise liquid crystal device (LCD) switch arrays. Further alternatively, any other suitable types of electrical and optical switching technologies may be used for transmitter switchover.

Turning back to FIGS. 1A-1B, in some embodiments, the AOC 30 may deliver data between two or more devices 22A, 22B. In some embodiments, the connectors 26A and 26B may carry data for a plurality of end devices, which may be connected to intermediate devices 22A, 22B such as network switches. In such embodiments, the AOC 30 may transfer two or more datalinks between the switches 22A, 22B for two or more network-connected devices. For example, in some embodiments, either or both the switches 22A, 22B may be connected to two or more end devices (e.g., networked servers), which may each send and receive datalinks over the AOC 30. In such embodiments, one or more of the channels may be used to direct a datalink between two specified end devices of the total two or more end devices connected to the switches 22A, 22B. As used herein, the term "datalink" refers to an electronic connection and exchange of information between two or more specified end devices. As discussed herein, one AOC 30 may handle multiple datalinks between the same two or more end devices or between different end devices.

Although the embodiments of FIGS. 4-11 depict four channels for transmitting datalinks on the AOC 30, in some embodiments other numbers of datalinks may be established on more or less channels. For example, some embodiments may include twelve channels. In some embodiments, the present reconfigurable and redundant connector may be made by retrofitting a programmable optical interface module 32 onto an existing optical transceiver and/or reprogramming an existing optical transceiver having an optical interface module.

Reconfiguration and Redundancy

Embodiments of the presently-described transceiver module may establish datalinks between varying, reconfigurable numbers of end devices using one or more channels of the AOC 30. The optical interface module 32 may allocate and transmit the datalinks over all or less-than-all of the channels depending upon the number of datalinks and the needed link budget and bandwidth.

For example, with reference to FIG. 4, a block diagram of the optical interface module 32 is shown transmitting signals 42, 46, 47, 48, 49, 58, 59, 60, 61, 70, 71, 72, 73, 76, 78 on four channels of a four channel configuration. In the embodiment shown in FIG. 4, the first and second channels' signals 46, 47, 58, 59, 70, 71, 76 carry a first datalink between them to a first receiving device, and the third and fourth channels' signals 48, 49, 60, 61, 72, 73, 78 carry a second datalink between them to a second receiving device. The depicted embodiment carries two datalinks over four channels, each datalink being transmitted at two times the bandwidth of a single channel (e.g., a 4×2 configuration).

With reference to FIG. 5, the block diagram of the optical interface module 32 of FIG. 4 is shown having a failure at the third transducer array 66. In such embodiments, the port definition driver 44 detects a fault in the transducer array 66, as discussed below, and instructs the channel counter 54 to deactivate the third transducer array 66. In the depicted embodiment, the third transducer array 66 and third channel counter 54, which at least partially define the third channel 67, and the fourth transducer array 68 and fourth channel counter 56, which at least partially define the fourth channel 69, carry portions of the same, second datalink prior to the failure. The third channel 67 and fourth channel 69 (prior to a failure) thereby transmit the second datalink with approximately twice the bandwidth of a single channel, and provide redundancy to one another. Thus, upon failure of the transducer array 66 of the third channel 67 in the embodiment shown in FIG. 5, the optical interface module 32 continues to transmit the second datalink over only the fourth channel, such that data transmission may be slower but uninterrupted. In other embodiments, a datalink may be initially transmitted over a single channel (e.g., third channel 67) and upon detecting a failure, the datalink may be transferred to an inactive channel (e.g., fourth channel 69) by activating the previously inactive channel and transmitting the datalink at the original bandwidth. In such embodiments, the inactive channel (e.g., the fourth channel 69) may be solely redundant.

With reference to FIG. 6, a block diagram illustrating the operation of the transceiver module according to FIGS. 4-5 is shown. In the embodiments of FIGS. 4-6, the port definition 44 receives electrical signals corresponding to two datalinks for transmission. The port definition 44 then assigns the datalinks to the respective ports 80, 82, 84, 86 depending on which channel (e.g., channels 63, 65, 67, 69 shown in FIGS. 4-5) is needed to transmit the appropriate datalink. For example, the port definition 44 may route all data from a datalink 76 intended for a first receiving device (e.g., a first server via switch 22B) through a first port 80 or a second port 82, defining the respective first and second channels. Similarly, the port definition 44 may route all data from a datalink 78 intended for a second receiving device (e.g., a second server via switch 22B) through a third port 84 or a fourth port 86, defining the respective third and fourth channels. In some embodiments, the first and second channels may not connect to the second receiving device, and the third and fourth channels may not connect to the first receiving device. The port definition 44 may further include channel counters (e.g., channel counters 50, 52, 54, 56 shown in FIGS. 4-5).

With continued reference to FIG. 6, the ports 80, 82, 84, 86, then convey the data over copper connectors 88 to the channel circuitry, which includes transducer arrays 62, 64, 66, 68. In the depicted embodiment, each of the transducer arrays 62, 64, 66, 68 of the respective channels includes four transducers 62A-D, 64A-D, 66A-D, 68A-D (e.g., VCSELs). The optical outputs from the respective transducers 62A-D, 64A-D, 66A-D, 68A-D may then be combined by a selective combiner 74 for transmission over one or more fibers 28. In the depicted embodiment, the four channels (e.g., channels 63, 65, 67, 69 shown in FIGS. 4-5 corresponding to ports 80, 82, 84, 86) may transmit two datalinks to two receiving devices. In some embodiments, the selective combiner 74 may include a lens assembly or other optical connector for each datalink, and in some embodiments, a single selective combiner may selectively direct the datalinks 76, 78 to the respective fibers 28.

The first port 80 and first transducer array 62A-D and the second port 82 and the second transducer array 64A-D may have their respective outputs combined to form the first datalink 76. The controller may divide the datalink across the two channels, such that the first channel (e.g., first channel 63 shown in FIGS. 4-5) transmits a first portion of the datalink and the second channel (e.g., second channel 65 shown in FIGS. 4-5) transmits a second portion of the datalink. In such embodiments, the bandwidth of the first datalink 76 may be effectively doubled by simultaneously transmitting over two channels.

The third port 84 and third transducer array 66A-D and the fourth port 86 and the fourth transducer array 68A-D may have their respective outputs combined to form the second datalink 78. The controller may divide the datalink across the two channels, such that the third channel (e.g., third channel 67 shown in FIGS. 4-5) transmits a first portion of the second datalink and the fourth channel (e.g., fourth channel 69 shown in FIGS. 4-5) transmits a second portion of the second datalink. In such embodiments, the bandwidth of the second datalink 78 may be effectively doubled by simultaneously transmitting from two channels at once. For example, as detailed herein, in embodiments in which each channel transmits 25 Gb/s, the first datalink 76 and the second datalink 78 may be transmitted at 50 Gb/s each in the embodiment of FIGS. 4-6. Similarly, in embodiments in which each channel transmits 50 Gb/s, the first datalink 76 and the second datalink 78 may be transmitted at 100 Gb/s each in the embodiment of FIGS. 4-6.

In some embodiments, upon detecting a fault in any one of the transducers 62A-D, 64A-D, 66A-D, 68A-D, the corresponding channel may be deactivated, such that the datalinks 76, 78 may be transmitted over a single channel. In such embodiments, the datalink of the deactivated channel may be transmitted more slowly than the combined transmission of two channels, but may nonetheless remain uninterrupted after a failure of one or more transducers.

With reference to FIG. 7, one embodiment of the transceiver depicted in FIGS. 4-6 is shown. In the depicted embodiment, a simplex design of the transceiver 26A is shown, having two datalinks established over four bundles of cable 29. In the simplex design, each pair 90, 92 of bundles 29 represents a transmit/receive pair, in which one of the bundles 29 transmits with a transducer array (e.g., VCSELs) in a single direction to a receiving connector, and a second bundle 29 receives transmitted signals with a photodiode or other receiving element. In the depicted embodiment, the first datalink is sent and received over the first bundle pair 90, and the second datalink is sent and received over the second bundle pair 92. In the embodiments of FIGS. 4-7, the AOC uses four channels to transmit two datalinks, leaving each datalink with two corresponding channels for providing redundancy and improving bandwidth.

Turning to FIG. 8, a block diagram of the optical interface module 32 is shown transmitting signals 42, 46, 47, 48', 49', 58, 59, 60', 61', 70, 71, 72', 73', 76' on four channels of a four channel configuration in accordance with another embodiment discussed herein. In the embodiment shown in FIG. 8, the first channel 63, the second channel 65, the third channel 67, and the fourth channel 69 cooperate to transmit signals 46, 47, 48', 49', 58, 59, 60', 61', 70, 71, 72', 73', 76' carrying single datalink 76' between them to a first receiving device. Accordingly, the depicted embodiment carries one datalink over four channels at four times the bandwidth of a single channel (e.g., a 4×1 configuration). In the 4×1 configuration, the connector may thus have $\alpha^3$ redundancy.

With reference to FIG. 9, the block diagram of the optical interface module 32 of FIG. 8 is shown having a failure at the third transducer array 66. In such embodiments, the port definition driver 44 detects a fault in the transducer array 66, as discussed below, and instructs the channel counter 54 to deactivate the third transducer array 66. In the depicted embodiment, the first transducer array 62 and first channel counter 50, which at least partially define the first channel 63, the second transducer array 64 and second channel counter 52, which at least partially define the second channel 65, the third transducer array 66 and third channel counter 54, which at least partially define the third channel 67, and the fourth transducer array 68 and fourth channel counter 56, which at least partially define the fourth channel 69, each carry portions of the same datalink prior to the failure. The first channel 63, second channel 65, third channel 67, and fourth channel 69 thereby transmit the datalink with approximately four times the bandwidth of a single channel, and provide redundancy to one another. Thus, upon failure of the third transducer array 66 in the embodiment shown in FIG. 9, the optical interface module 32 continues to transmit the datalink over the first, second, and fourth channels, such that data transmission may be slower but uninterrupted. In some embodiments, a datalink may be transmitted over fewer than the total available channels (e.g., the fourth channel 69 being inactive) and upon detecting a failure, the datalink may be transferred to an inactive channel (e.g., fourth channel 69) by activating the previously inactive channel and transmitting the datalink at the original bandwidth. In such embodiments, the inactive channel (e.g., the fourth channel 69) may be solely redundant.

With reference to FIG. 10, a block diagram illustrating the operation of the transceiver module according to FIGS. 8-9 is shown. In the embodiments of FIGS. 8-9, the port definition 44 receives electrical signals corresponding to a datalink for transmission. The port definition 44 then assigns portions of the datalink to one or more of the respective ports 80, 82, 84, 86 depending on which channel (e.g., channels 63, 65, 67, 69 shown in FIGS. 4-5) is needed. For example, the port definition 44 may route all data from the datalink 76 intended for a first receiving device (not shown) through one or more of the first port 80, the second port 82, the third port 84, or the fourth port 86 defining the respective first, second, third, and fourth channels. The port definition 44 may further include channel counters (e.g., channel counters 50, 52, 54, 56 shown in FIGS. 8-9).

With continued reference to FIG. 10, the ports 80, 82, 84, 86, then convey the data over copper connectors 88 to the channel circuitry, which includes transducers arrays 62, 64, 66, 68. In the depicted embodiment, each of the transducer arrays 62, 64, 66, 68 of the respective channels includes four transducers 62A-D, 64A-D, 66A-D, 68A-D (e.g., VCSELs). The optical outputs from the respective transducers 62A-D, 64A-D, 66A-D, 68A-D are then combined by a selective combiner 74 for transmission over one or more fibers 28. In the depicted embodiment, the four channels (e.g., channels 63, 65, 67, 69 shown in FIGS. 4-5 corresponding to ports 80, 82, 84, 86) may transmit one datalink to one receiving device. In some embodiments, the selective combiner 74 may include a lens assembly or other optical connector for combining the optical outputs from each of the transducers to form the total datalink.

The first port 80 and first transducer array 62A-D, the second port 82 and the second transducer array 64A-D, the third port 84 and third transducer array 66A-D, and the fourth port 86 and the fourth transducer array 68A-D may have their respective outputs, including portions of the first datalink, combined to form the first datalink 76. In some embodiments, any subcombination of the ports 80, 82, 84, 86 may be used to transmit the datalink, with the remaining channels being redundant. The controller may divide the datalink across the four channels, such that the first channel (e.g., first channel 63 shown in FIGS. 8-9) transmits a first portion of the datalink, the second channel (e.g., second channel 65 shown in FIGS. 8-9) transmits a second portion of the datalink, the third channel (e.g., third channel 67 shown in FIGS. 8-9) transmits a third portion of the datalink, and the fourth channel (e.g., fourth channel 69 shown in FIGS. 8-9) transmits a fourth portion of the datalink. In such embodiments, the bandwidth of the datalink 76 may be effectively quadrupled by simultaneously transmitting from four channels at once. For example, as detailed herein, in embodiments in which each channel transmits 25 Gb/s, the first datalink 76 may be transmitted at 100 Gb/s in the embodiment of FIGS. 8-10. Similarly, in embodiments in which each channel transmits 50 Gb/s, the first datalink 76 may be transmitted at 200 Gb/s in the embodiment of FIGS. 8-10.

In some embodiments, upon detecting a fault in any one of the transducers 62A-D, 64A-D, 66A-D, 68A-D, the corresponding channel may be deactivated, such that the datalink 76 may be transmitted over three or fewer channels. In such embodiments, the datalink of the deactivated channel may be transmitted more slowly than the combined transmission of four channels, but may nonetheless remain uninterrupted after a failure of one or more transducers.

With reference to FIG. 11, one embodiment of the transceiver depicted in FIGS. 8-10 is shown. In the depicted embodiment, a simplex design of the transceiver 26A is shown, having one datalink established over two bundles of cable 29. In the simplex design, the pair 90' of bundles 29 represents a transmit/receive pair, in which one of the bundles 29 transmits with a transducer (e.g., VCSEL) in a single direction to a receiving connector, and a second bundle 29 receives transmitted signals with a photodiode or other receiving element. In the depicted embodiment, the datalink is sent and received over the bundle pair 90'. In the embodiments of FIGS. 8-10, the AOC uses four channels to transmit one datalink, leaving the datalink with four corresponding channels for providing redundancy and improving bandwidth. Moreover, in the embodiment depicted in FIGS. 8-10, two or three channels may fail without interrupting transmission of the datalink 76.

In some embodiments, the channels may be combined to create combinations of datalinks having various bandwidths between any number of sending and receiving end devices. Each of the channels may be capable of transmitting a proportional amount of the total bandwidth of the AOC 30. For example, some embodiments of the AOC 30 have a 100 Gb/s bandwidth. In such embodiments, a four-channel connector according to some embodiments detailed herein may include four 25 Gb/s channels. The channels of the four-channel connectors and corresponding fibers may be reconfigured to transmit four datalinks at 25 Gb/s each, two datalinks at 50 Gb/s each, one datalink at 100 Gb/s, or uneven combinations of datalinks as discussed herein. Similar connectors may be configured in any subdivision of datalinks depending on the number of available channels. As discussed above, the connectors may use one or more inactive and/or redundant channels, where the redundancy is provided at a port level. Although the embodiments of FIGS. 5 and 9 show transducer failures, the apparatus and methods detailed herein are equally applicable for detecting and compensating for other failures in each channel, such as failure at the fiber, that prevent transmission of a datalink over one or more of the channels.

Fault Detection

A failure of a given transmitter may be detected using several techniques.

In some embodiments, a controller at the transmit end (e.g., at the optical interface module 32) may locally sense changes in the response of a failed transmitter (for example, via a respective driver circuit) and thus may detect the failure based on changes in the characteristics of the failed transmitter. Changes in the response may comprise, for example, changes in current consumption, impedance, or any other suitable measure. The failure may be detected, for example, by the port definition driver 44 as carried out by the controller. In response to detecting one or more failed transmitters in one of the channels, the channel may be deactivated. The port definition driver 44 may redistribute the datalinks from the failed channel to other channels of the connector as detailed above.

In some embodiments, a controller at the receiver end (e.g., device 22B) in the AOC 30 may notify its controller, or a controller at the transmit end (e.g., at the optical interface module 32), of the need to bypass the failed transmitter.

In a further embodiment, an item (e.g., device 22B) at the receiving end of AOC 30, may detect a dark fiber, which means that a one or more transmitters in a communication channel is not functioning. In such an event, switch B may command the controller (of the optical interface module 32), via a suitable in-band signal or out-of-band connection, to actuate the necessary switches to bypass the failed transmitter.

The configurations of AOC 30 shown in FIGS. 1-11 are example configurations, which are chosen for the sake of conceptual clarity. In alternative embodiments, any other suitable configuration can be used for implementing the active optical cable. Certain elements of AOC 30 can be implemented using hardware, such as using one or more Application-Specific Integrated Circuits (ASICs) or Field-Programmable Gate Arrays (FPGAs) or other device types. Additionally or alternatively, certain elements of the AOC 30, such as, for example, the OIM, controller, port definition, channel counter, transducer, or selective combiner, can be implemented using software, or using a combination of hardware and software elements.

FIG. 12 is a flow chart that schematically illustrates a method for transmitting one or more datalinks using an AOC 30 having redundant and reconfigurable connectors, in accordance with an embodiment of the present invention. Methods of assembling a transceiver module may also be used to construct a transceiver having the characteristics described herein.

The method of FIG. 12 receives electrical signals at the connector 26A from one or more devices 22A at block 120. The received electrical signals correspond to at least one datalink. The connector then transmits the at least one datalink over a fiber 28 via at least one of a plurality of channels at block 122. In some embodiments, the failure of one or more transducers associated with the at least one of the plurality of channels may be detected at block 124. The connector may redistribute the at least one datalink onto one or more different channels during transmission of the at least one datalink at block 126. The redistribution may be user actuated or automatically controlled by the system, and may be either spontaneous (e.g., in response to a change in bandwidth needs or user preference) or in response to detection of the transducer failure (block 124).

Many modifications and other embodiments of the inventions set forth herein will come to mind to one skilled in the art to which these inventions pertain having the benefit of the teachings presented in the foregoing descriptions and the associated drawings. Although the figures only show certain components of the apparatus and systems described herein, it is understood that various other components (e.g., components that would normally be mounted on the PCB assembly) may also be part of the optoelectronic interface and fiber optic system. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An electro-optical connector comprising:
   a first port and a second port configured to receive electrical inputs;
   a first plurality of electro-optical transducers in electrical communication with the first port, wherein the first plurality of electro-optical transducers is configured to convert between first electrical signals received via the first port and respective first optical signals, wherein the first port and the first plurality of electro-optical transducers define a first channel;
   a second plurality of electro-optical transducers in electrical communication with the second port, wherein the second plurality of electro-optical transducers is configured to convert between second electrical signals received via the second port and respective second optical signals, wherein the second port and the second plurality of electro-optical transducers define a second channel;
   a selective combiner configured to combine the first optical signals and the second optical signals for transmission via one or more optical fibers to a first receiving device; and
   a controller in communication with each of the first plurality of electro-optical transducers and the second plurality of electro-optical transducers,
      wherein the controller is configured to transmit at least a first portion of a first datalink on at least the first channel in a first configuration,
      wherein the first datalink defines an electrical communication between a first transmitting device and the first receiving device via the one or more fibers,
      wherein the controller is configured to redistribute the first portion of the first datalink onto at least the second channel in a second configuration, and
      wherein the first configuration comprises a different selection of channels than the second configuration.

2. The electro-optical connector of claim 1, wherein in the first configuration, the controller is configured to transmit at least a second portion of the first datalink on the second channel.

3. The electro-optical connector of claim 2, wherein in the first configuration, the first datalink consists of the first portion of the first datalink and the second portion of the first datalink.

4. The electro-optical connector of claim 1, wherein in the second configuration, the controller is configured to transmit the first datalink on the second channel.

5. The electro-optical connector of claim 1, wherein the controller is configured to redistribute the first portion of the first datalink onto at least the second channel in response to failure of one or more of the first plurality of electro-optical transducers.

6. The electro-optical connector of claim 1, further comprising:
   a third port and a fourth port configured to receive additional electrical inputs;
   a third plurality of electro-optical transducers in electrical communication with the third port, wherein the third plurality of electro-optical transducers is configured to convert between third electrical signals received via the third port and respective third optical signals, wherein the third port and the third plurality of electro-optical transducers define a third channel;
   a fourth plurality of electro-optical transducers in electrical communication with the fourth port, wherein the fourth plurality of electro-optical transducers is configured to convert between fourth electrical signals received via the fourth port and respective fourth optical signals, wherein the fourth port and the fourth plurality of electro-optical transducers define a fourth channel;
   wherein the selective combiner is configured to combine the third optical signals and the fourth optical signals for transmission via one or more second fibers to a second receiving device; and
   wherein the controller is in communication with each of the third plurality of electro-optical transducers and the fourth plurality of electro-optical transducers,
      wherein the controller is configured to transmit at least a first portion of a second datalink on at least the third channel in the third configuration, wherein the controller is configured to redistribute the first portion of the second datalink onto at least the fourth channel in the fourth configuration, and wherein the third configuration comprises a second different selection of channels than the fourth configuration.

7. The electro-optical connector of claim 6, wherein the second datalink is different than the first datalink, and wherein the second receiving device is different than the first receiving device.

8. The electro-optical connector of claim 1, further comprising:

a fifth port and a sixth port configured to receive further electrical inputs;

a fifth plurality of electro-optical transducers in electrical communication with the fifth port, wherein the fifth plurality of electro-optical transducers is configured to convert between fifth electrical signals received via the fifth port and respective fifth optical signals, wherein the fifth port and the fifth plurality of electro-optical transducers define a fifth channel;

a sixth plurality of electro-optical transducers in electrical communication with the sixth port, wherein the sixth plurality of electro-optical transducers is configured to convert between sixth electrical signals received via the sixth port and respective sixth optical signals, wherein the sixth port and the sixth plurality of electro-optical transducers define a sixth channel;

wherein the selective combiner is configured to combine the fifth optical signals and the sixth optical signals for transmission via the one or more fibers to the first receiving device; and wherein the controller is in communication with each of the fifth plurality of electro-optical transducers and the sixth plurality of electro-optical transducers, wherein the controller is configured to transmit additional respective portions of the first datalink to the first receiving device on the fifth channel and the sixth channel.

9. The electro-optical connector of claim 8, wherein in the first configuration, the controller is configured to transmit at least a second portion of the first datalink on the second channel.

10. The electro-optical connector of claim 9, wherein in the first configuration, the first datalink consists of the first portion, the second portion, a fifth portion defining the respective portion of the first datalink on the fifth channel, and the sixth portion defining the respective portion of the first datalink on the sixth channel.

11. A method for transmitting one or more datalinks via an electro-optical connector, the electro-optical connector comprising a first port and a second port configured to receive electrical inputs; a first plurality of electro-optical transducers in electrical communication with the first port, wherein the first plurality of electro-optical transducers is configured to convert between first electrical signals received via the first port and respective first optical signals, wherein the first port and the first plurality of electro-optical transducers define a first channel; a second plurality of electro-optical transducers in electrical communication with the second port, wherein the second plurality of electro-optical transducers is configured to convert between second electrical signals received via the second port and respective second optical signals, wherein the second port and the second plurality of electro-optical transducers define a second channel; a selective combiner configured to combine the first optical signals and the second optical signals for transmission via one or more optical fibers to a first receiving device; and a controller in communication with each of the first plurality of electro-optical transducers and the second plurality of electro-optical transducers; the method comprising:

transmitting, in a first configuration, with the controller, at least a first portion of a first datalink on at least the first channel, wherein the first datalink defines an electrical communication between a first transmitting device and the first receiving device via the one or more fibers;

redistributing the first portion of the first datalink onto at least the second channel in a second configuration, wherein the first configuration comprises a different selection of channels than the second configuration.

12. The method of claim 11 further comprising, in the first configuration, transmitting at least a second portion of the first datalink on the second channel.

13. The method of claim 12, wherein in the first configuration, the first datalink consists of the first portion of the first datalink and the second portion of the first datalink.

14. The method of claim 11 further comprising, in the second configuration, transmitting the first datalink on the second channel.

15. The method of claim 11, wherein redistributing the first portion of the first datalink onto at least the second channel in the second configuration further comprises detecting a failure of one or more of the first plurality of electro-optical transducers.

16. The method of claim 11, wherein the electro-optical connector further comprises a third port and a fourth port configured to receive additional electrical inputs; a third plurality of electro-optical transducers in electrical communication with the third port, wherein the third plurality of electro-optical transducers is configured to convert between third electrical signals received via the third port and respective third optical signals, wherein the third port and the third plurality of electro-optical transducers define a third channel; and a fourth plurality of electro-optical transducers in electrical communication with the fourth port, wherein the fourth plurality of electro-optical transducers is configured to convert between fourth electrical signals received via the fourth port and respective fourth optical signals, wherein the fourth port and the fourth plurality of electro-optical transducers define a fourth channel; wherein the selective combiner is configured to combine the third optical signals and the fourth optical signals for transmission via one or more second fibers to a second receiving device; and wherein the controller is in communication with each of the third plurality of electro-optical transducers and the fourth plurality of electro-optical transducers; the method further comprising:

transmitting at least a first portion of a second datalink on at least the third channel in the third configuration; and redistributing the first portion of the second datalink onto at least the fourth channel in the fourth configuration, wherein the third configuration comprises a second different selection of channels than the fourth configuration.

17. The method of claim 16, wherein the second datalink is different than the first datalink, and wherein the second receiving device is different than the first receiving device.

18. The method of claim 11, wherein the electro-optical connector further comprises a fifth port and a sixth port configured to receive further electrical inputs; a fifth plurality of electro-optical transducers in electrical communication with the fifth port, wherein the fifth plurality of electro-optical transducers is configured to convert between fifth electrical signals received via the fifth port and respective fifth optical signals, wherein the fifth port and the fifth plurality of electro-optical transducers define a fifth channel; a sixth plurality of electro-optical transducers in electrical communication with the sixth port, wherein the sixth plurality of electro-optical transducers is configured to convert between sixth electrical signals received via the sixth port and respective sixth optical signals, wherein the sixth port and the sixth plurality of electro-optical transducers define a sixth channel; wherein the selective combiner is configured to combine the fifth optical signals and the sixth optical signals for transmission via the one or more fibers to the first receiving device; and wherein the controller is in communication with each of the fifth plurality of electro-optical transducers and the sixth plurality of electro-optical transducers; the method further comprising:

transmitting additional respective portions of the first datalink to the first receiving device on the fifth channel and the sixth channel.

19. The method of claim 18, the first configuration comprises transmitting at least a second portion of the first datalink on the second channel.

20. The method of claim 19, wherein in the first configuration, the first datalink consists of the first portion, the second portion, a fifth portion defining the respective portion of the first datalink on the fifth channel, and the sixth portion defining the respective portion of the first datalink on the sixth channel.

* * * * *